United States Patent
Steben et al.

(10) Patent No.: US 12,348,512 B2
(45) Date of Patent: Jul. 1, 2025

(54) METHOD AND SYSTEM FOR EASDF SECURE SERVICE

(71) Applicant: Verizon Patent and Licensing Inc., Basking Ridge, NJ (US)

(72) Inventors: Jerry Steben, Fort Worth, TX (US); David Taft, Keller, TX (US); Maqbool Chauhan, Keller, TX (US); Tony Ferreira, Fairfield, CT (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 152 days.

(21) Appl. No.: 18/307,950

(22) Filed: Apr. 27, 2023

(65) Prior Publication Data
US 2024/0364679 A1 Oct. 31, 2024

(51) Int. Cl.
*H04L 9/08* (2006.01)
*H04L 9/40* (2022.01)
*H04L 61/4511* (2022.01)
*H04L 61/5046* (2022.01)

(52) U.S. Cl.
CPC ........ *H04L 63/083* (2013.01); *H04L 61/4511* (2022.05); *H04L 61/5046* (2022.05)

(58) Field of Classification Search
None
See application file for complete search history.

(56) References Cited

U.S. PATENT DOCUMENTS

| | | | |
|---|---|---|---|
| 9,762,612 B1* | 9/2017 | Schiffman | H04L 41/0631 |
| 9,961,066 B1* | 5/2018 | Kitchen | H04L 63/0807 |
| 2011/0119306 A1* | 5/2011 | Patil | H04L 63/0236 |
| | | | 707/783 |
| 2018/0048665 A1* | 2/2018 | Shulman | H04L 63/1425 |
| 2018/0234246 A1* | 8/2018 | Johnson | H04L 67/52 |
| 2020/0007585 A1* | 1/2020 | Williams | H04L 9/0891 |
| 2024/0205300 A1* | 6/2024 | Kim | H04L 61/4511 |
| 2024/0236840 A1* | 7/2024 | Li | H04W 48/18 |

FOREIGN PATENT DOCUMENTS

WO WO-2022057662 A1 * 3/2022

* cited by examiner

*Primary Examiner* — Christopher B Robinson

(57) ABSTRACT

A method, a network device, and a non-transitory computer-readable storage medium are described in relation to an EASDF secure service. The EASDF secure service may include a network-side service that may validate access and authorization to use a domain name system (DNS) resolver device, such as an edge application server discovery function. The network-side service may validate access and authorization of an end device based on tokens. The EASDF secure service may include an end device-side service that includes a token with a DNS query to the DNS resolver device. The end device-side service may further provide authorization regarding access and use of applications, networks, and application devices that host applications and/or assets by the end device at the end device. The end device-side service may determine access and/or authorization based on tokens and a validation procedure performed at the end device.

20 Claims, 9 Drawing Sheets

METHOD AND SYSTEM FOR EASDF SECURE SERVICE

BACKGROUND

Development and design of networks present certain challenges from a network-side perspective and an end device perspective. For example, Next Generation (NG) wireless networks, such as Fifth Generation New Radio (5G NR) networks are being deployed and are under development. With the advent of edge computing, end devices may use an Edge Application Server Discovery Function (EASDF) to resolve fully qualified domain names (FQDNs), among other things.

DETAILED DESCRIPTION

Figure 1:
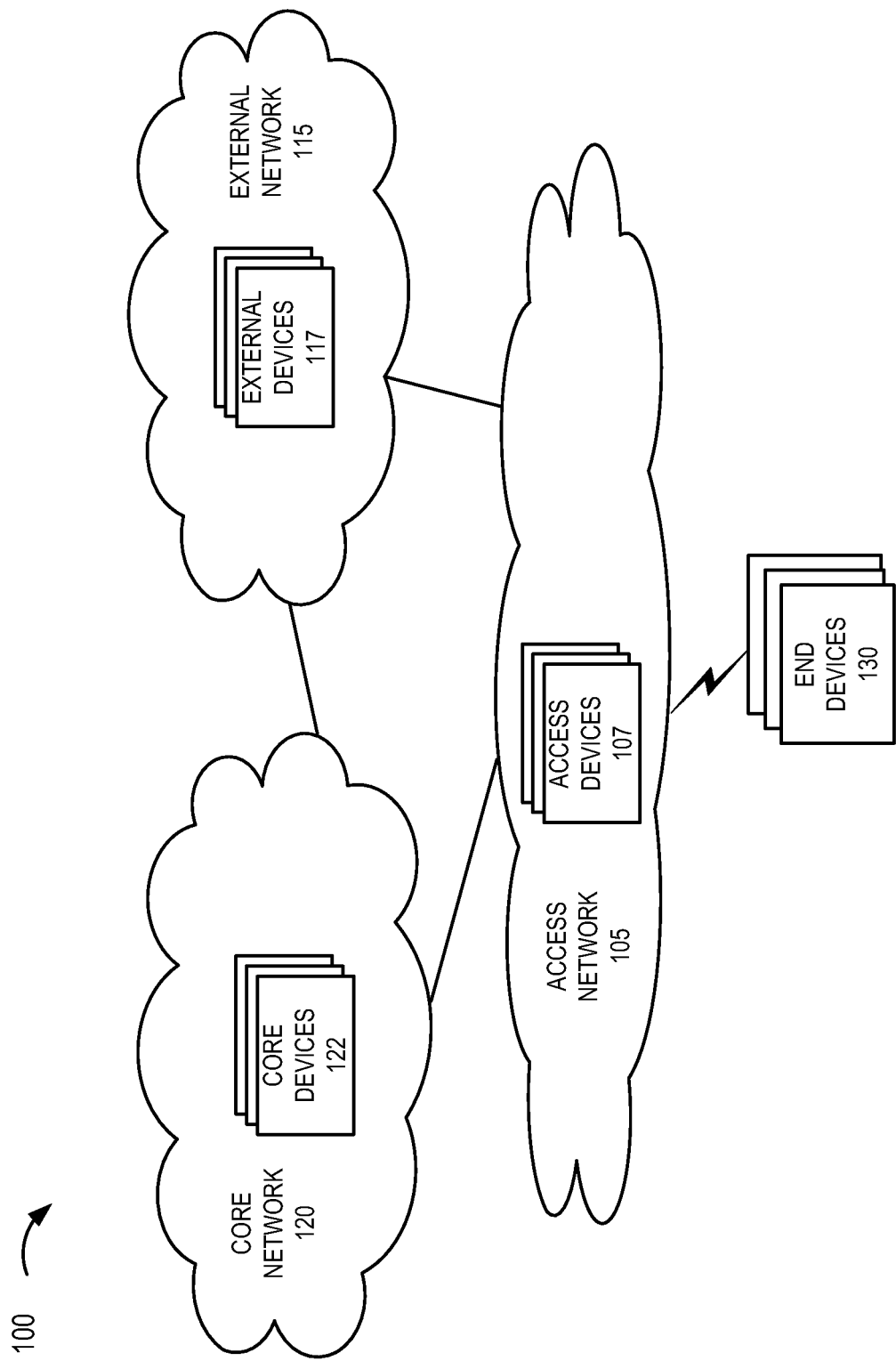
FIG. 1 is a diagram illustrating an exemplary environment in which an exemplary embodiment of an EASDF secure service may be implemented.

The following detailed description refers to the accompanying drawings. The same reference numbers in different drawings may identify the same or similar elements. Also, the following detailed description does not limit the invention.

As a part of edge service provisioning, current procedures include resolving an application server's FQDN to a server instance that may be closest to an end device. The EASDF may receive domain name system (DNS) requests from the end device for server FQDN resolution. In this way, the network may redirect the DNS request to a DNS server that may host the application server which is closest to the end device. In a 5G core network, a session management function (SMF) may perform data network selection and DNS server selection that will resolve the FQDN of the application server based on the location of the end device.

Current standards, however, do not address issues relating to security and the use of the EASDF by the end device. For example, there is no mechanism regarding authorization for the end device to use the EASDF as opposed to another operator-based DNS server. Additionally, for example, there is no mechanism to ensure that the end device is authenticated and/or authorized to use the EASDF, which may be associated with an entity, such as a network operator. Accordingly, the EASDF may be exposed to unauthorized use by end devices.

According to exemplary embodiments, an EASDF secure service is provided. According to an exemplary embodiment, the EASDF secure service may authorize an end device to access the EASDF. According to an exemplary embodiment, the EASDF secure service may provide a token to the end device. The token may be used to determine whether the end device is authorized to access the EASDF. According to an exemplary embodiment, an SMF, an AMF, an MME, or other suitable network device may provide the token to the end device. According to an exemplary embodiment, the EASDF secure service may provide the token to the end device via a protocol configuration options (PCO) container or another suitable data instance.

According to an exemplary embodiment, the EASDF secure service may provide that the end device includes the token with a DNS query to the EASDF. According to an exemplary embodiment, based on receipt of the DNS query and token, the EASDF may perform a validation procedure to determine whether the token is valid or not. When the EASDF determines that the token is valid, the EASDF may generate and transmit a DNS response, which may include an EAS network address and other relevant information, to the end device. When the EASDF determines that the token is invalid, the EASDF may generate and transmit a DNS response, which may include data indicating an error, a network address of another DNS resolver, a network address of a secondary application server, or some combination thereof, to the end device.

According to an exemplary embodiment, the EASDF secure service may provide authorization for an application, a network, and/or application device access and use by the end device, as described herein. For example, the end device may obtain a first token from a network device, such as the SMF, the AMF, the MME, or another suitable network device. According to an exemplary embodiment, the end device may include logic that may obtain a second token and compare the first and second tokens. Based on a result of the comparison, the end device may determine whether the end device is authorized to access and/or use the application, the network, and/or the application device. According to an exemplary embodiment, when the end device is authorized, the end device may query the EASDF, as described herein. According to an exemplary embodiment, when the end device is not authorized, the end device may prevent a query process to the EASDF, as described herein.

According to an exemplary embodiment, the EASDF secure service may be subscription-based. For example, a core device that stores subscription information of the end device may include tokens that may be used to provide the EASDF secure service, as described herein.

In view of the foregoing, the EASDF secure service may prevent unauthorized access and use of EASDF services by end devices. Additionally, the EASDF secure service may ensure that EDC clients of end devices are authorized to access and use an application (e.g., an edge application), a network (e.g., an edge network), and/or an application device (e.g., an application server, a multi-access edge computing (MEC) server, or the like).

FIG. 1 is a diagram illustrating an exemplary environment 100 in which an exemplary embodiment of an EASDF secure service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the EASDF secure service may use at least one of these planes of communication.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a 4G or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

Depending on the implementation, access network 105 may include one or multiple types of network devices, such as access devices 107. For example, access device 107 may include a gNB, an evolved Long Term Evolution (eLTE) eNB, an eNB, a radio network controller (RNC), a RAN intelligent controller (RIC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access customer premise equipment (FWA CPE), etc.) that provides a wireless access service. As such, access network 105 may include access devices 107 that constitute cellular access devices and non-cellular access devices, as described herein. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple radio access technologies (RATs) (e.g., 4G and 5G functionality, 5G and 5.5G functionality, etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

External network 115 may include one or multiple networks of one or multiple types and technologies that provides an application service. For example, external network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), an SMF, a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), an application function (AF), a lifecycle management (LCM) device, a mobility management entity (MME), a packet data network gateway (PGW), an enhanced packet data gateway (ePDG), a serving gateway (SGW), an EASDF, a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW–C), a UPF with PGW user plane functionality (e.g., UPF+PGW–U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

According to an exemplary embodiment, at least some of core devices 122 include logic of an exemplary embodiment of a network-side EASDF secure service, as described herein. According to an exemplary embodiment, an SMF, an AMF, or a similar type of network device (e.g., an MME, etc.) may provide one or multiple tokens (e.g., a token for EASDF access authorization, a token for application, network, application device access authorization, etc.) to end device 130, an EASDF, a DNS resolver, or a similar network device. According to an exemplary embodiment, a UDR or similar type of subscription storage device (e.g., an HSS, etc.) may store and provide tokens (e.g., the token for EASDF access authorization, the token for application, network, application device access authorization) to other core devices 122, as described herein.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, a fixed wireless device, a router, a sensor, an automated guided vehicle (AGV), an industrial robot, or other type of wireless device (e.g., other type of user equipment (UE)). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device. End device 130 may be implemented as a virtualized device in whole or in part.

According to an exemplary embodiment, at least some of end devices 130 include logic of an exemplary embodiment of an end device-side EASDF secure service, as described herein. According to an exemplary embodiment, end device 130 may obtain and store a token, which may be used for authorizing EASDF access, as described herein. According to an exemplary embodiment, end device 130 may obtain and store tokens, which may be used for authorizing application, network, and/or application device access, as described herein. According to an exemplary embodiment, the end device-side EASDF secure service may use a result of the application, network, and/or application device authorization procedure as a basis to determine whether EASDF access is permitted or not, as described herein.

Figure 2:
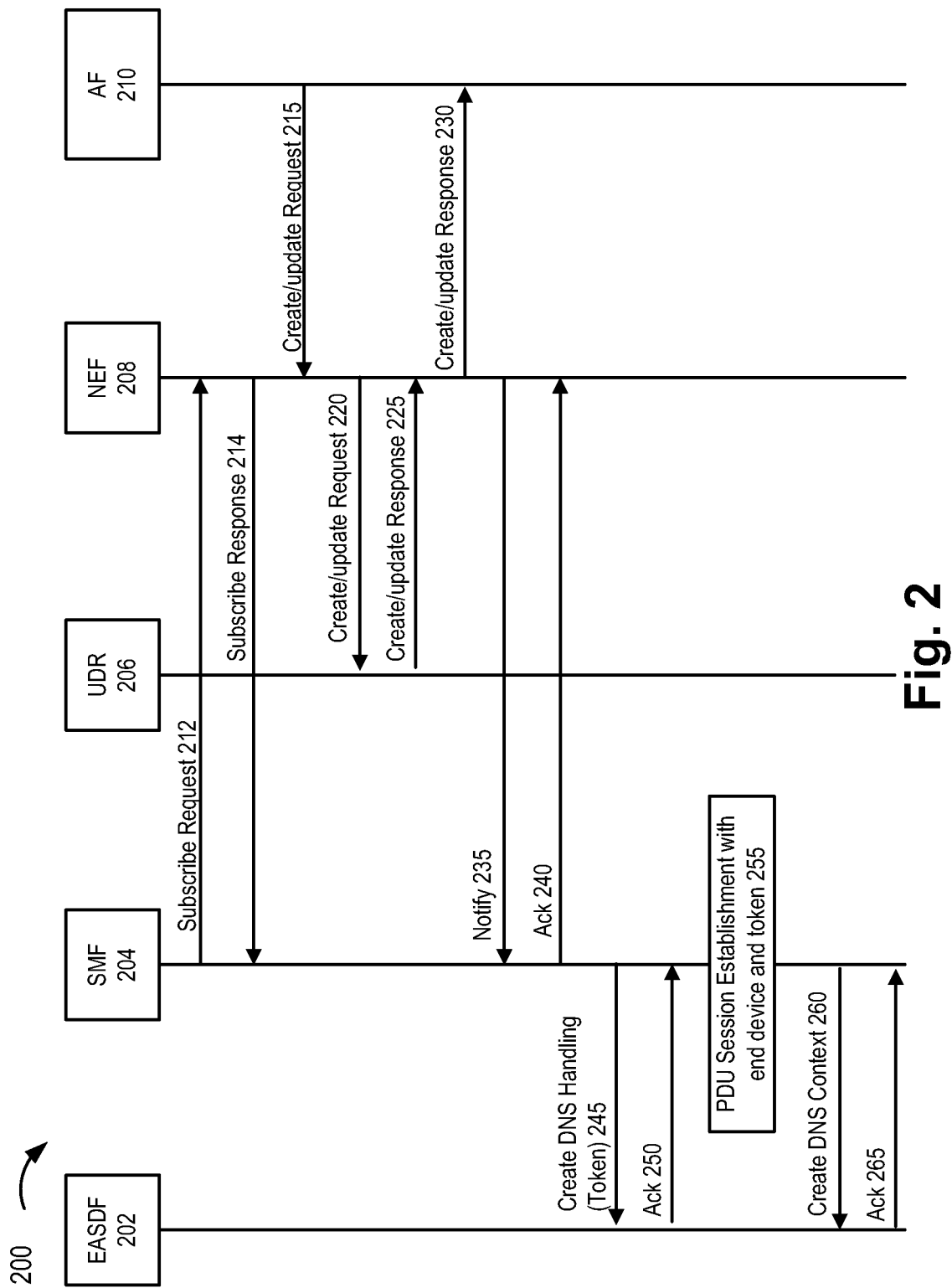
FIG. 2 is a diagram illustrating an exemplary environment in which an exemplary process of an exemplary embodiment of the EASDF secure service may be implemented.

FIG. 2 is a diagram illustrating an exemplary process 200 in which an exemplary embodiment of the EASDF secure service may be implemented. As illustrated, an exemplary environment may include an EASDF 202, an SMF 204, a UDR 206, a NEF 208, and an AF 210. According to other exemplary embodiments, the environment may include additional and/or different external devices 117 and/or core devices 122, as described herein.

EASDF 202, SMF 204, UDR 206, NEF 208, and AF 210 may provide functions and/or operations of a proprietary and/or standard compliant (e.g., Third Generation Partnership Project (3GPP), 3GPP2, International Telecommunication Union (ITU), European Telecommunications Standards Institute (ETSI), GSM Association (GSMA), and the like) nature. Additionally, at least some of core devices 122, such as EASDF 202, SMF 204, and UDR 206 may each include logic that provides the network-side service of the EASDF secure service, as described herein.

Referring to FIG. 2, SMF 204 may generate and transmit a subscribe request 212 to NEF 208. For example, subscribe request 212 may relate to an EAS deployment subscribe procedure, and may include a request to NEF 208 for application information pertaining to an EAS (not illustrated). Subscribe request 212 may include a data network name (DNN), a single network slice selection assistance information (S-NSSAI), and other types of information. In response to receiving subscribe request 212, NEF 208 may configure the EAS deployment subscription. NEF 208 may generate and transmit a subscribe response 214, which may include an indication that the subscription has been accepted.

According to this exemplary environment, AF 210 may be a third party AF that communicates with core devices 122 via NEF 208. AF 210, NEF 208, and UDR 206 may exchange various messages, such as a create/update request 215, a create/update request 220, a create/update response 225, and a create/update response 230, which may relate to the provisioning of various information associated with the EAS, such as an EAS identifier, an FQDN of the EAS, an EAS network address (e.g., EAS Internet Protocol (IP) address, etc.), a data network access identifier (DNAI), DNS server information, and the like. Subsequently, NEF 208 may communicate similar information via a notify 235 to SMF 204, which may be acknowledged 240.

As a part of the EAS secure service, SMF 204 may generate and transmit a create DNS handling message 245 that may include information associated with the EAS (e.g., EAS FQDN, EAS IP address, DNS server information, etc.) and a token. According to an exemplary embodiment, the token may be implemented as an OAuth 2.0 token or another type of authorization and/or access token that may be used to determine authorization of access to EASDF 202 by end device 130, as described herein. EASDF 202 may generate and transmit an acknowledgement 250. EASDF 202 may store the token and one or more instances of EAS information, which may be correlated with the token.

Additionally, as a part of the EAS secure service, SMF 204 may transmit messages pertaining to a PDU Session Establishment with end device and token 255. As described further in relation to FIG. 3, SMF 204 may select a token pertaining to access authorization to EASDF 202 by end device 130 and transmit the token to end device 130. As further illustrated, after the PDU Session Establishment procedure, SMF 204 may generate and transmit a Create DNS context message 260 to EASDF 202. Create DNS context message 260 may include application and UE information, such as a network address (e.g., UE IP address) and an identifier of end device 130 (e.g., Subscription Permanent Identifier (SUPI), International Mobile Subscriber Identity (IMSI) or the like), a DNN, an EAS FQDN, an EAS IP address, and other types of relevant information pertaining to EAS and/or end device 130, for example. EASDF 202 may store and correlate one or more instances of this information to the previously obtained token. EASDF 202 may generate and transmit an acknowledgement 265.

Figure 3:
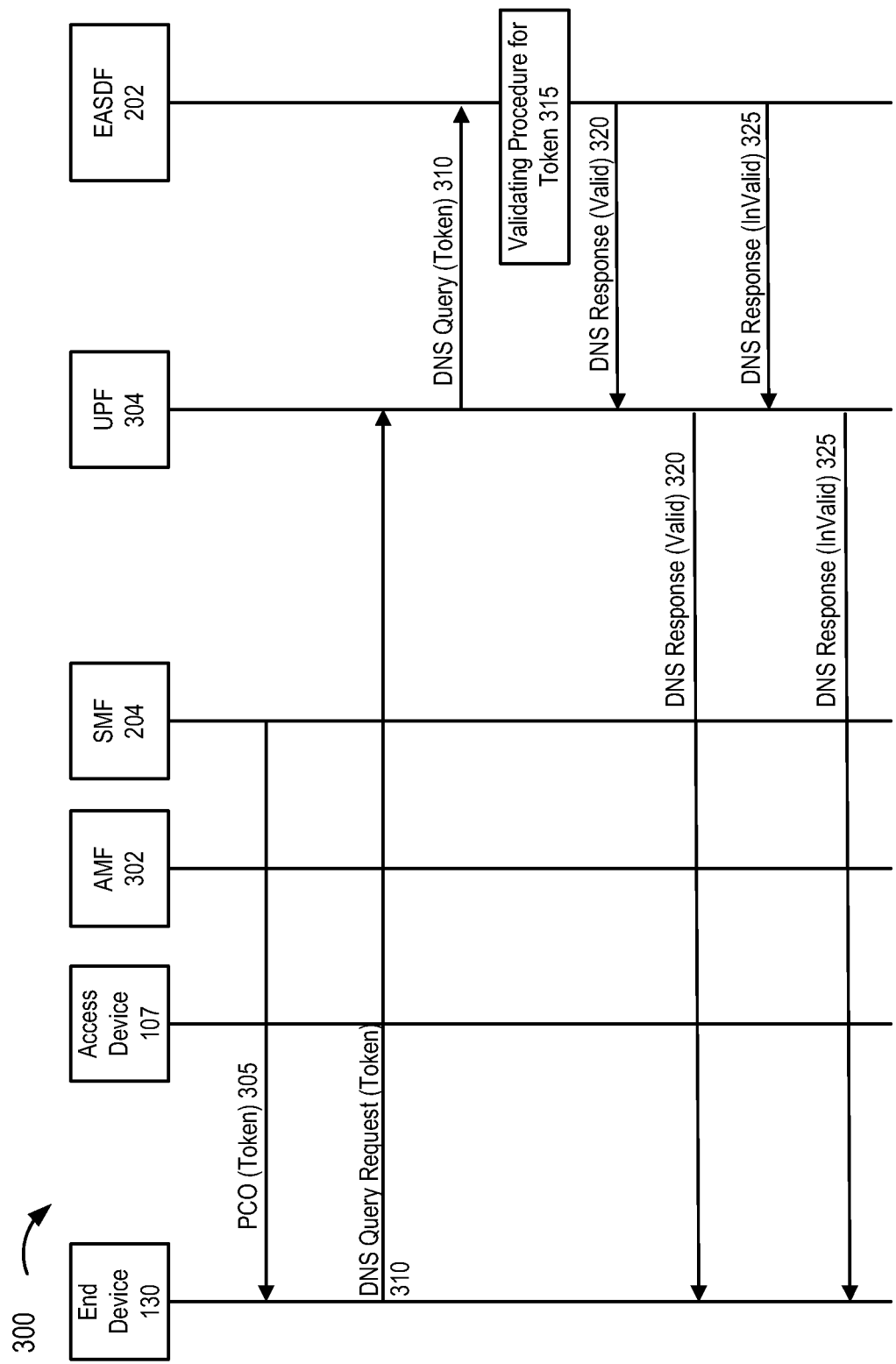
FIG. 3 is a diagram illustrating another exemplary environment in which another exemplary process of an exemplary embodiment of the EASDF secure service may be implemented.

FIG. 3 is a diagram illustrating an exemplary process 300 in which an exemplary embodiment of the EASDF secure service may be implemented. As illustrated, an exemplary environment may include an AMF 302 and an UPF 304, in addition to EASDF 202, SMF 204, access device 107, and end device 130, which have been previously described. AMF 302 and UPF 304 may provide functions and/or operations of a proprietary and/or standard compliant (e.g., 3GPP, 3GPP2, ITU, ETSI, GSMA, and the like) nature. Additionally, at least some of core devices 122, such as EASDF 202 and AMF 302 may each include logic that provides the network-side service of the EASDF secure service, as described herein.

As previously described, SMF 204 may generate and transmit a message, which may include the access and/or authorization token, to end device 130. For example, during a PDU Session Establishment Procedure, SMF 204 may generate and transmit N1 and N2 message transfer message, which includes the access and/or authorization token, to AMF 302. AMF 302 or similar core device 122 (e.g., MME) may transmit the token to end device 130 via access device 107 (e.g., a gNB, a DU, an RU, etc.). As an example, an N2 PDU Session request, a non-access stratum (NAS) message, a radio resource control (RRC) message, and/or another type of control plane message may include the token. According to an exemplary embodiment, the access and/or authorization token may be included as a PCO data instance.

According to an exemplary scenario, end device 130 (e.g., by a user (not illustrated)) may execute an application, which may cause end device 130 to perform an EAS discovery procedure. For example, the EAS discovery procedure may include end device 130 to generate a DNS query request that includes a token 310, and transmit the DNS query request to UPF 304, which may be transmitted to EASDF 202. The DNS query request may include end device information, such as a network address of end device 130 and/or a unique identifier of end device 130 (e.g., SUPI, IMSI, etc.), as described herein. According to other exemplary scenarios, DNS query request 310 may relate to an EAS re-discovery procedure.

In response to receiving DNS query request with token 310, EASDF 202 may perform a validating procedure for token 315. For example, EASDF 202 may perform a lookup of a database or data structure that stores token information correlated to EAS information. EASDF 202 may select the stored token (e.g., received in relation to message 245 of process 200) based on common correlated information associated with the tokens (e.g., end device information, EAS information, etc.). EASDF 202 may compare the stored token to the received token from end device 130. Based on a result of the comparison, EASDF 202 may determine whether end device 130 is authorized to access and use the EASDF services of EASDF 202. For example, when the tokens match and/or the received token is valid, EASDF 202 may generate and transmit a DNS response (valid) 320, which may be further transmitted by UPF 304, to end device 130. DNS response 320 may include an IP address of the EAS pertaining to DNS query 310. However, when the tokens do not match and/or the received token is determined to be invalid, EASDF 202 may generate and transmit a DNS response (invalid) 325, which may be further transmitted by UPF 304, to end device 130. According to various exemplary embodiments, DNS response (invalid) 325 may be implemented in numerous ways according to operator policies. For example, DNS response (invalid) 325 may include a rejection of the DNS request. According to another example, DNS response (invalid) 325 may include a redirect to another EASDF or DNS resolver. According to yet another example, DNS response (invalid) 325 may include an IP address of a secondary EAS that may be used by non-validated/not authorized end devices 130.

Figure 4:
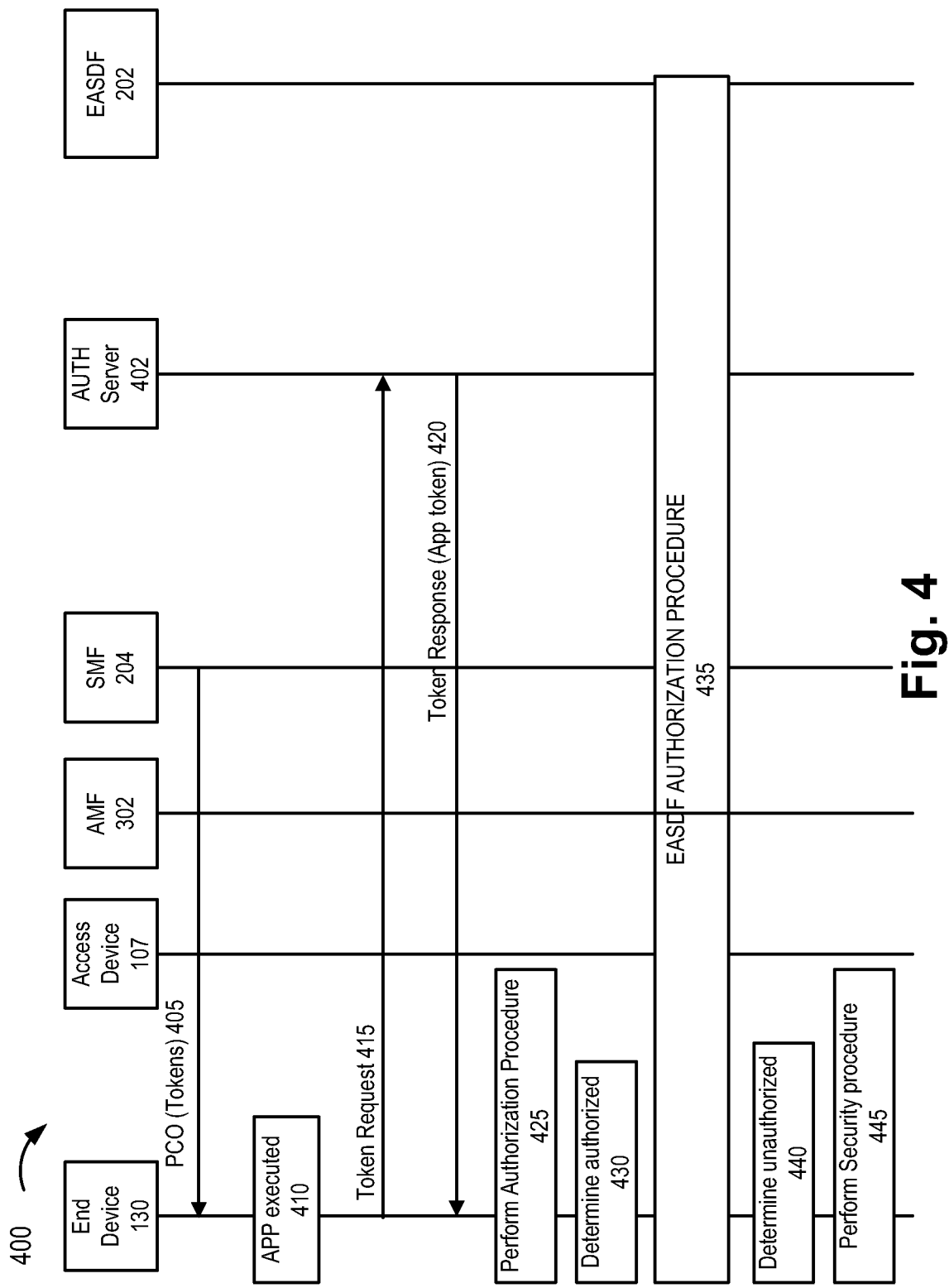
FIG. 4 is a diagram illustrating yet another exemplary environment in which yet another exemplary process of an exemplary embodiment of the EASDF secure service may be implemented.

FIG. 4 is a diagram illustrating an exemplary process 400 in which an exemplary embodiment of the EASDF secure service may be implemented. As illustrated, an exemplary environment may include an authorization server 402, in addition to EASDF 202, SMF 204, access device 107, and end device 130, which have been previously described.

According to an exemplary embodiment, the EASDF secure service may provide authorization for an application, a network, and/or application device access and use by the end device 130. For example, in a manner similar to that previously described, SMF 204 may transmit multiple tokens to end device 130. For example, the tokens may include an EASDF token for access and/or authorization, and application token for access and/or authorization pertaining to an application of the EAS, the network of the EAS, and/or the EAS. According to some exemplary embodiments, although not illustrated, UDR 206 may store the tokens as a part of subscription information. SMF 204 may obtain the tokens via signaling with UDR 206 during a PDU Session Establishment procedure. For example, SMF 204 may communicate with UDR 206 via a UDM in response to receiving a Create SM Context Request from AMF 302.

According to an exemplary scenario, end device 130 (e.g., by a user (not illustrated)) may execute an application 410, which may cause end device 130 to perform an EAS secure service procedure. For example, end device 130 may include logic that may obtain an authorization token pertaining to the application from authorization server 402. As an example, authorization server 402 may be implemented as a clearinghouse device (e.g., associated with OAuth 2.0 or another type of secure token service). The EAS secure service logic may generate and transmit a token request 415 to authorization server 402 via an application programming interface (API). The EAS secure service logic may communicate with an edge DNS client (EDC). According to an exemplary embodiment, the EAS secure service logic may be invoked for non-native applications resident on end device 130. According to such an exemplary embodiment, native applications and/or pre-installed applications may not be subjected to the application authorization procedure of the end device-side service of the EAS secure service, as described herein. Alternatively, only pre-installed applications may not be subjected to the application authorization procedure.

In response to receiving token request 415, authorization server 402 may perform a lookup for an authorization token based on the information included in token request 415. For example, token request 415 may include an application identifier, a unique identifier of end device 130, and so forth. Authentication server 405 may select a corresponding authorization token, and generate and transmit token response 420, which includes the application authorization token, to end device 130. In response, the EAS secure service logic may perform an authorization procedure 425 and determine whether end device 130 is authorized 430 to access and/or use the application (e.g., the application of the EAS), the network (e.g., the MEC, a data network, etc.) that hosts the application, and/or the application device (e.g., the EAS, the MEC server, etc.). For example, the EAS secure service logic may compare the application token received in message 405 to the application token received in message 420. When end device 130 determines that the application is authorized for access and/or use (e.g., the application tokens match) 430, the EAS secure service logic may invoke, enable, or permit an EASDF authorization procedure 435, as previously described. For example, end device 130 may generate and transmit a DNS query token with token 310, as previously described in relation to FIG. 3. However, when end device 130 determines that the application is not authorized for access and/or use (e.g., the application tokens do not match) 440, end device 130 may perform a security procedure 445, such as terminate the execution of the application and/or perform another type of operation based on operator policies.

FIGS. 2-4 illustrate exemplary processes of the EASDF secure service according to an exemplary scenario, however, according to other exemplary embodiments, the process may include additional, fewer, and/or different operations than those depicted and described in relation to FIGS. 2-4. The messages illustrated and described are exemplary.

Figure 5:
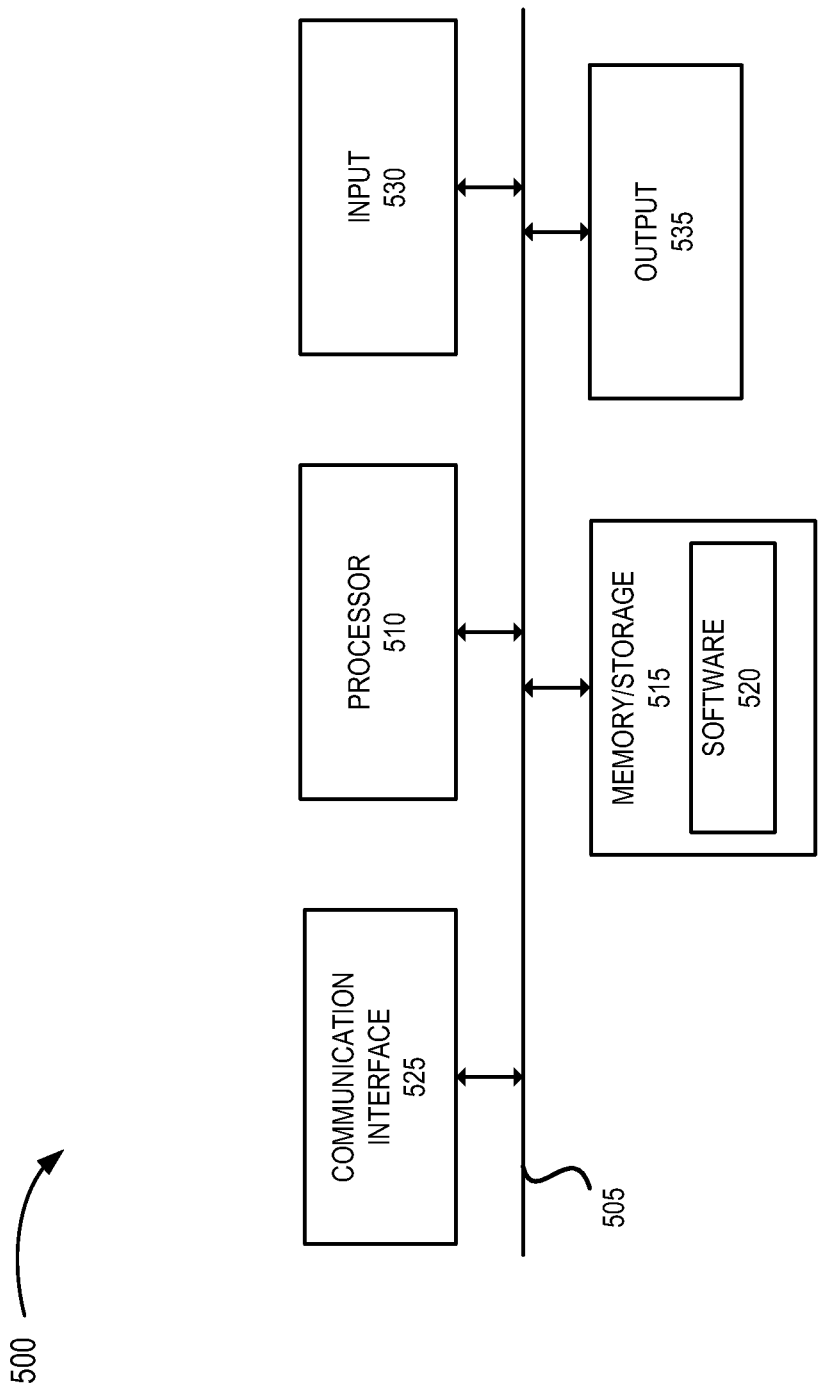
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to access device 107, external device 117, core device 122, end device 130, and/or other types of devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 515 may be external to and/or removable from device 500, such as, for example, a Universal Serial Bus (USB) memory stick, a dongle, a hard disk, mass storage, off-line storage, or some other type of storing medium. Memory/storage 515 may store data, software, and/or instructions related to the operation of device 500.

Software 520 includes an application or a program that provides a function and/or a process. As an example, with reference to end device 130, software 520 may include an application that, when executed by processor 510, provides a function and/or a process of the end device-side service of the EASDF secure service, as described herein. Additionally, for example, with reference to core device 122, software 520 may include an application that, when executed by processor 510, provides a function and/or a process of the network-side service of the EASDF secure service, as described herein. Software 520 may also include firmware, middleware, microcode, hardware description language (HDL), and/or another form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces, optical interfaces, and/or wired interfaces. For example, communication interface 525 may include one or multiple transmitters and receivers, or transceivers. Communication interface 525 may operate according to a protocol stack and a communication standard.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 500 may be implemented in the same manner. For example, device 500 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 500 may be configured to perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 may be configured to performs a function or a process described herein based on the execution of hardware (processor 510, etc.).

Figure 6:
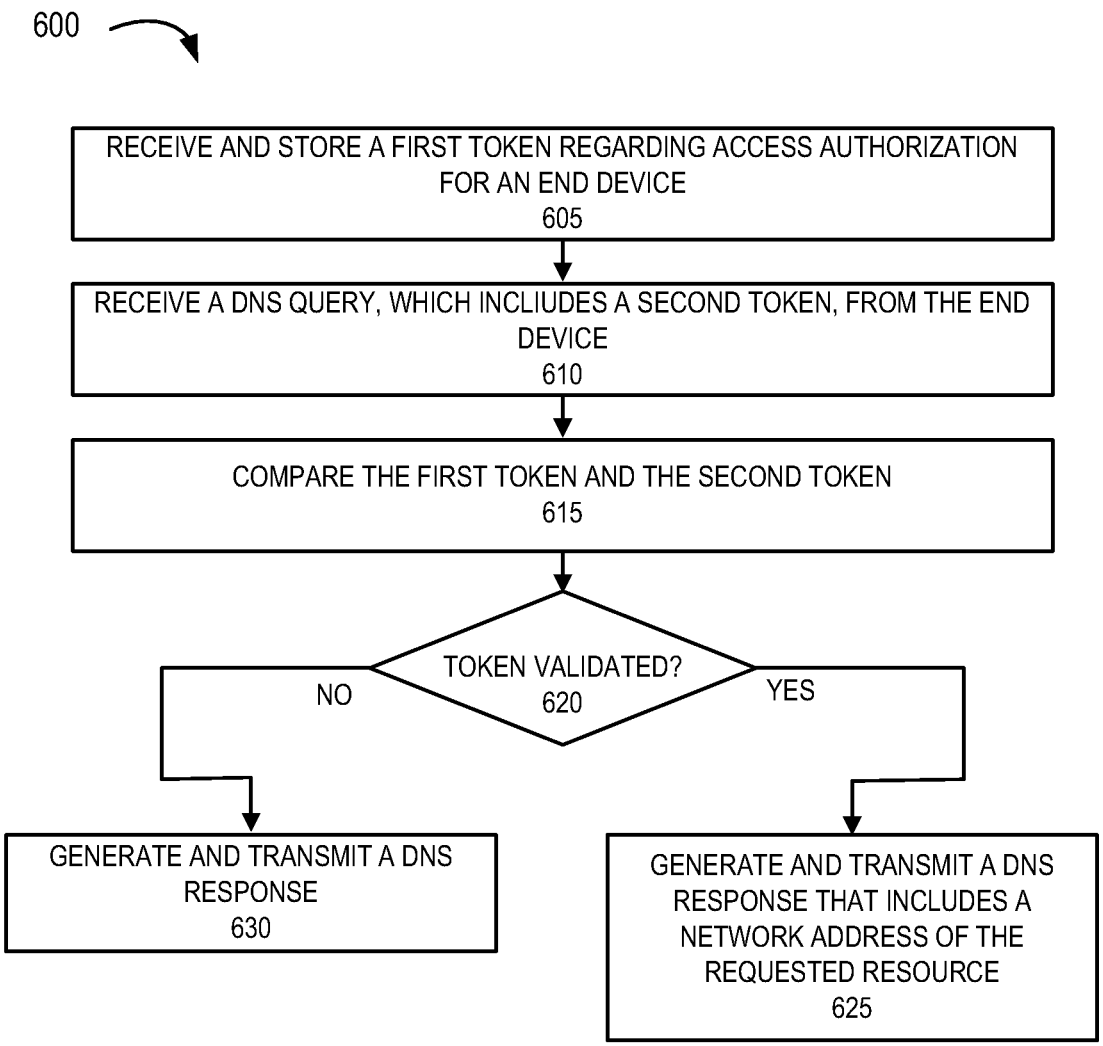
FIG. 6 is a flow diagram illustrating an exemplary process of an exemplary embodiment of the EASDF secure service.

FIG. 6 is a flow diagram illustrating an exemplary process 600 of an exemplary embodiment of the EASDF secure service. According to an exemplary embodiment, a DNS resolver (e.g., EASDF 202 or a similar type of network device) may perform process 600. According to an exemplary implementation, processor 510 executes software 520 to perform a step of process 400, as described herein. Alternatively, a step may be performed by execution of only hardware. For purposes of description, process 600 is described as performed by EASDF 202.

In block 605, EASDF 202 may receive and store a first token regarding access authorization for end device 130. The first token may be correlated to an EAS FQDN, EAS IP address, DNS server information, a DNN that hosts the EAS, and end device information (e.g., end device 130 network address, a unique identifier, etc., as described herein.

In block 610, EASDF 202 may receive a DNS query, which may include a second token, from end device 130. For example, the second token may pertain to access authorization to EASDF 202 by end device 130. The DNS query may include other information, such as a unique identifier of end device 130, a network address of a resource (e.g., a URI, an FQDN, or the like), and/or other types of information, as described herein.

In block 615, EASDF 202 may compare the first token to the second token. For example, EASDF 202 may select the first token for comparison to the second token based on stored correlated end device information with the first token and end device information included in a DNS query, as described herein. EASDF 202 may determine whether the second token matches the first token.

In block 620, EASDF 202 may determine whether the second token is validated. For example, based on a result of the comparison, EASDF 202 may determine whether end device 130 is authorized to access and/or use EASDF 202.

When EASDF 202 determines that the first token and the second token match (block 620—YES), EASDF 202 may determine that the second token has been successfully validated, and may generate and transmit a DNS response, which may include a network address of the requested resource, to end device 130 (block 625). For example, EASDF 202 may perform a DNS resolution of an FQDN to an IP address associated with an EAS.

When EASDF 202 determines that the first token and the second token does not match (block 620—NO), EASDF 202 may determine that the second token has not been successfully validated, and may generate and transmit a DNS response, to end device (block 630). For example, according to various exemplary embodiments, the DNS response may include a rejection of access to EASDF 202, a network address of another DNS resolver device, or a network address of an alternate or secondary network device that may provide the requested resource.

FIG. 6 illustrates an exemplary process of the EASDF secure service, however, according to other exemplary embodiments, the EASDF secure service may perform additional operations, fewer operations, and/or different operations than those illustrated and described.

Figure 7:
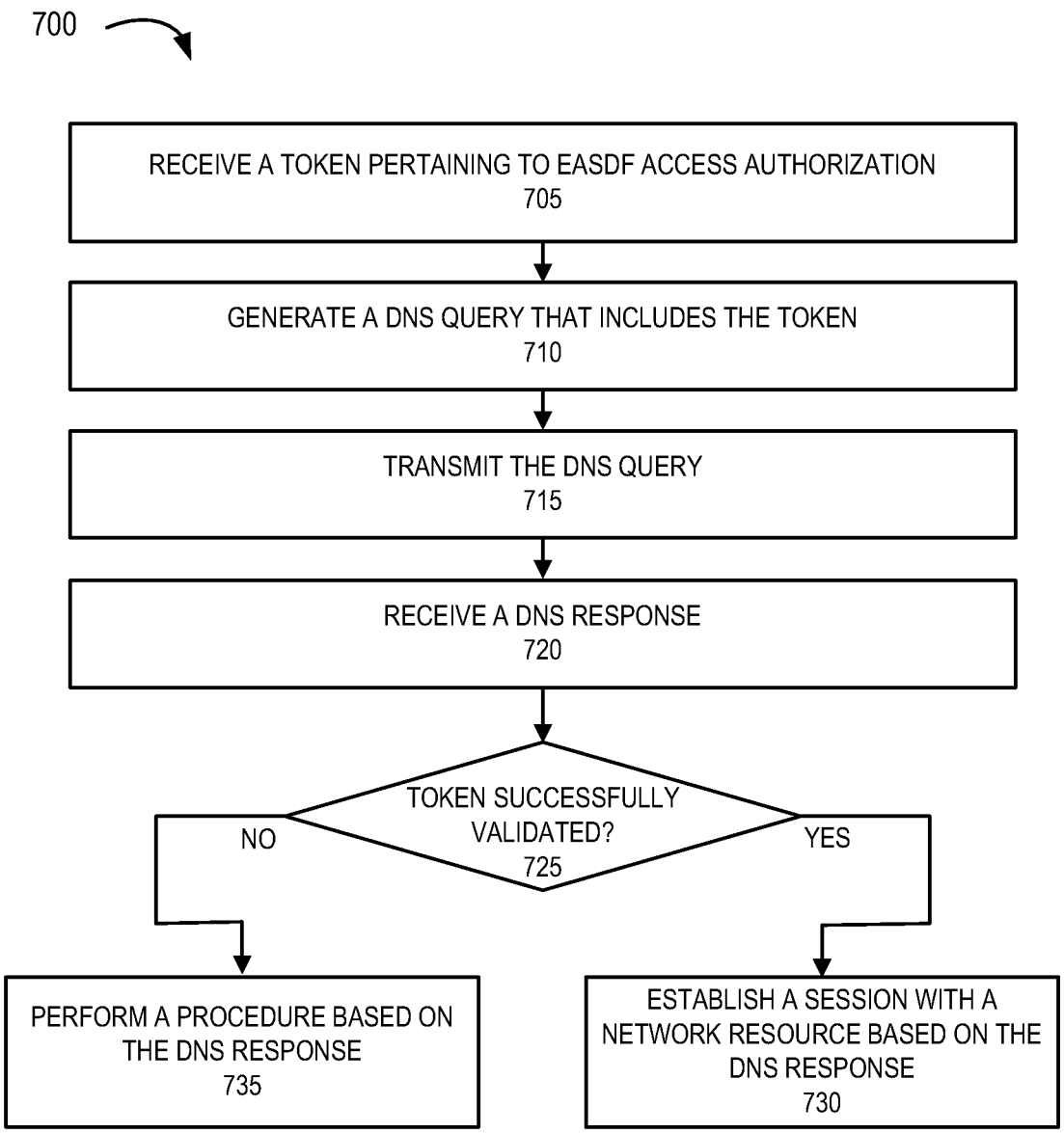
FIG. 7 is a flow diagram illustrating another exemplary process of an exemplary embodiment of the EASDF secure service.

FIG. 7 is a flow diagram illustrating another exemplary process 700 of an exemplary embodiment of the EASDF secure service. According to an exemplary embodiment, end device 130 may perform process 700. According to an exemplary implementation, processor 510 executes software 520 to perform a step of process 700, as described herein. Alternatively, a step may be performed by execution of only hardware.

In block 705, end device 130 may receive a token pertaining to EASDF access authorization. End device 130 may store the token. In block 710, end device 130 may generate a DNS query that includes the token. In block 715, end device 130 may transmit the DNS query to EASDF 202. In block 720, end device 130 may receive a DNS response from EASDF 202.

In block 725, end device 130 may determine whether the token was successfully validated. When end device 130 determines that the token was successfully validated (block 725—YES), end device 130 may establish a session with a network resource based on the DNS response (block 730). When end device 130 determines that the token was not successfully validated (block 725—NO), end device 130 may perform a procedure based on the DNS response (block 735). For example, end device 130 may perform an error handling procedure, communicate with another EASDF or DNS resolver, or establish a session with an EAS (e.g., secondary EAS, etc.), as described herein.

FIG. 7 illustrates an exemplary process of the EASDF secure service, however, according to other exemplary embodiments, the EASDF secure service may perform additional operations, fewer operations, and/or different operations than those illustrated and described.

Figure 8:
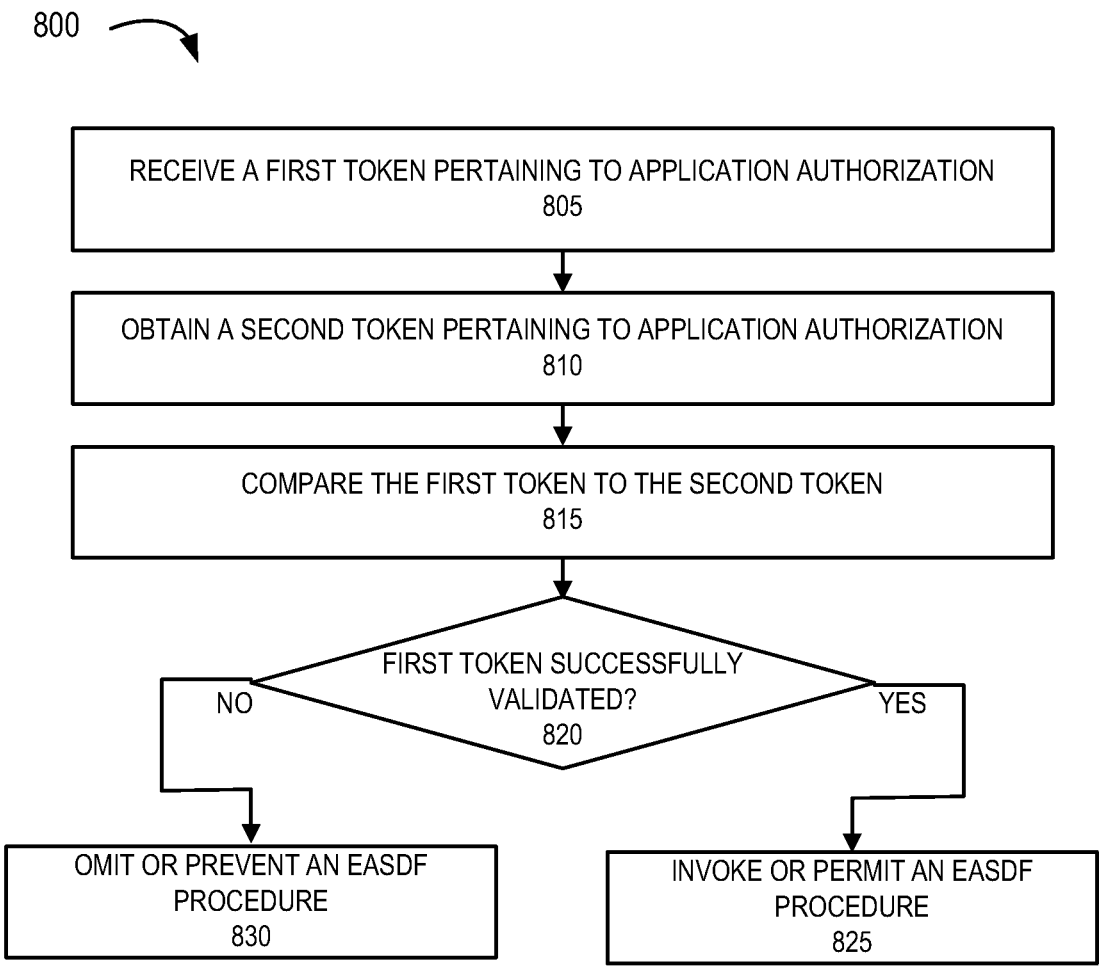
FIG. 8 is a flow diagram illustrating yet another exemplary process of an exemplary embodiment of the EASDF secure service.

FIG. 8 is a flow diagram illustrating another exemplary process 800 of an exemplary embodiment of the EASDF secure service. According to an exemplary embodiment, end device 130 may perform process 800. According to an exemplary implementation, processor 510 executes software 520 to perform a step of process 800, as described herein. Alternatively, a step may be performed by execution of only hardware.

In block 805, end device 130 may receive a first token pertaining to application authorization, as described herein. In block 810, end device 130 may obtain a second token pertaining to application authorization, as described herein. In block 815, end device 130 may compare the first token to the second token and determine whether end device 130 and/or a user is authorized to access and/or use the application, as described herein.

In block 820, end device 130 may determine whether the first token was successfully validated. For example, when the first token matches the second token, end device 130 may determine that end device 130 is authorized to access the application, the network, the application device, and/or other type of network resource device. When the first token does not match the second token, end device 130 may determine that end device 130 is not authorized to access the application, the network, the application device, and/or other type of network resource device.

When end device 130 determines that the first token was successfully validated (block 820—YES), end device 130 may invoke or permit an EASDF procedure (block 825). When end device 130 determines that the first token was not successfully validated (block 820—NO), end device 130 may omit to or prevent an EASDF procedure (block 830).

FIG. 8 illustrates an exemplary process of the EASDF secure service, however, according to other exemplary embodiments, the EASDF secure service may perform additional operations, fewer operations, and/or different operations than those illustrated and described.

Figure 9:
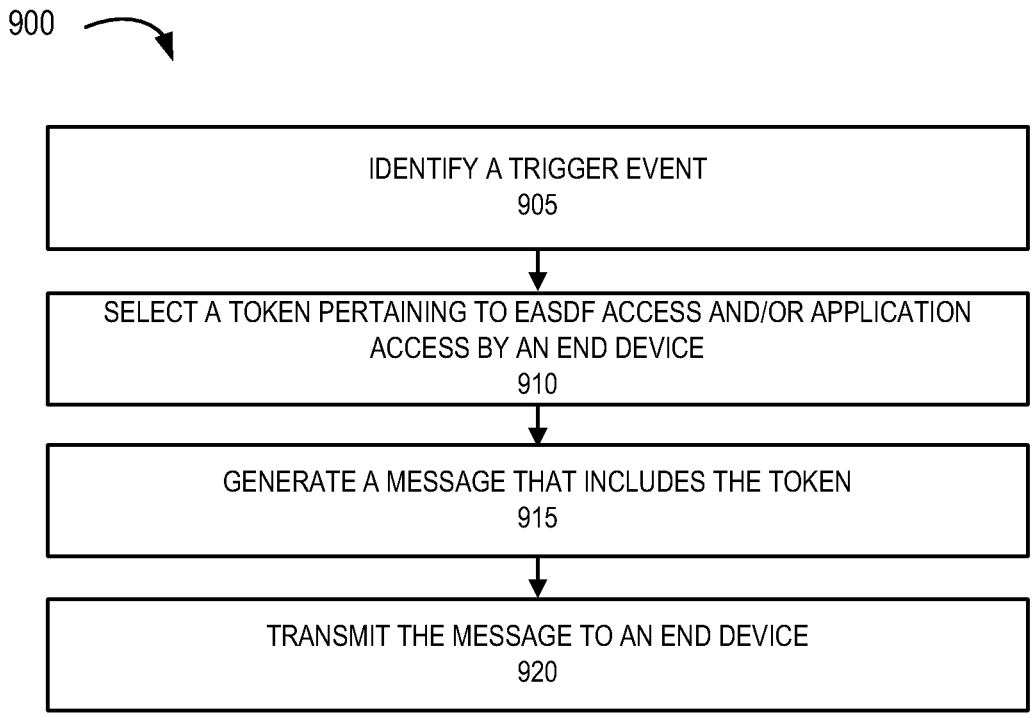
FIG. 9 is a flow diagram illustrating still another exemplary process of an exemplary embodiment of the EASDF secure service.

FIG. 9 is a flow diagram illustrating another exemplary process 900 of an exemplary embodiment of the EASDF secure service. According to an exemplary embodiment, core device 122 may perform process 900. According to an exemplary implementation, processor 510 executes software 520 to perform a step of process 900, as described herein. Alternatively, a step may be performed by execution of only hardware. For purposes of description only, process 900 is described as being performed by SMF 204.

In block 905, SMF 204 may identify a trigger event. For example, SMF 204 may receive a message related to establishing a PDU Session for end device 130.

In block 910, SMF 204 may select a token pertaining to EASDF access and/or application access by end device 130, as described herein. In block 915, SMF 204 may generate a message that includes the token. In block 920, SMF 204 may transmit the message to end device 130.

FIG. 9 illustrates an exemplary process of the EASDF secure service, however, according to other exemplary embodiments, the EASDF secure service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIGS. 6, 7, 8, and 9, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a domain name system (DNS) resolver device from a network device, a message that includes a first token pertaining to access authorization by an end device;
   receiving, by the DNS resolver device from the end device, a DNS query that includes a second token;
   comparing, by the DNS resolver device, the first token and the second token; and
   determining, by the DNS resolver device based on the comparing, whether the end device is authorized to access the DNS resolver device.

2. The method of claim 1, wherein the network device includes a session management function (SMF) of a core network.

3. The method of claim 1, further comprising:
   storing, by the DNS resolver device, the first token; and
   receiving, by the DNS resolver device from the network device before receiving the DNS query, end device information that includes a unique identifier of the end device, wherein the end device information is correlated to the first token.

4. The method of claim 1, further comprising:
   determining, by the DNS resolver device, that access is authorized;

generating, by the DNS resolver device, a response message to the DNS query that includes a network address of an application device regarding the DNS query; and transmitting, by the DNS resolver device to the end device, the response message.

5. The method of claim 1, further comprising:

determining, by the DNS resolver device, that access is not authorized;

generating, by the DNS resolver device, a response message to the DNS query that includes a network address of another DNS resolver device; and transmitting, by the DNS resolver device to the end device, the response message.

6. The method of claim 1, wherein the DNS query includes a unique identifier and a network address of the end device, and wherein the method further comprises:

selecting, by the DNS resolver device in response to receiving the DNS query, the first token based on at least one of the unique identifier or the network address of the end device.

7. The method of claim 1, wherein the message includes a network address and a fully qualified domain name of an application server.

8. The method of claim 1, wherein the DNS resolver device includes an edge application server discovery function (EASDF).

9. A network device comprising:

a processor that is configured to:

receive, from another network device, a message that includes a first token pertaining to access authorization by an end device, wherein the network device includes a domain name system (DNS) resolver device;

receive, from the end device, a DNS query that includes a second token;

compare the first token and the second token; and determine, based on the comparison, whether the end device is authorized to access the DNS resolver device.

10. The network device of claim 9, wherein the other network device includes a session management function (SMF) of a core network.

11. The network device of claim 9, wherein the processor is further configured to:

store the first token; and receive, from the other network device before receiving the DNS query, end device information that includes a unique identifier of the end device, wherein the end device information is correlated to the first token.

12. The network device of claim 9, wherein the processor is further configured to:

determine that access is authorized;

generate a response message to the DNS query that includes a network address of an application device regarding the DNS query; and transmit, to the end device, the response message.

13. The network device of claim 9, wherein the processor is further configured to:

determine that access is not authorized;

generate a response message to the DNS query that includes a network address of another DNS resolver device; and transmit, to the end device, the response message.

14. The network device of claim 9, wherein the DNS query includes a unique identifier and a network address of the end device, and wherein the processor is further configured to:

select, in response to receipt of the DNS query, the first token based on at least one of the unique identifier or the network address of the end device.

15. The network device of claim 9, wherein the message includes a network address and a fully qualified domain name of an application server.

16. The network device of claim 9, wherein the DNS resolver device includes an edge application server discovery function (EASDF).

17. A non-transitory computer-readable storage medium storing instructions executable by a processor of a domain name system (DNS) resolver device, wherein the instructions are configured to:

receive, from a network device, a message that includes a first token pertaining to access authorization by an end device;

receive, from the end device, a DNS query that includes a second token;

compare the first token and the second token; and determine, based on the comparison, whether the end device is authorized to access the DNS resolver device.

18. The non-transitory computer-readable storage medium of claim 17, wherein the instructions are further configured to:

determine that access is authorized;

generate a response message to the DNS query that includes a network address of an application device regarding the DNS query; and transmit, to the end device, the response message.

19. The non-transitory computer-readable storage medium of claim 17, wherein the instructions are further configured to:

determine that access is not authorized;

generate a response message to the DNS query that includes a network address of another DNS resolver device; and transmit, to the end device, the response message.

20. The non-transitory computer-readable storage medium of claim 17, wherein the DNS query includes a unique identifier and a network address of the end device, and wherein the instructions are further configured to:

select, in response to receipt of the DNS query, the first token based on at least one of the unique identifier or the network address of the end device.

* * * * *